United States Patent
Luoma et al.

(10) Patent No.: US 10,916,922 B2
(45) Date of Patent: *Feb. 9, 2021

(54) MOUNTABLE ELECTRICAL SYSTEM

(71) Applicant: Eaton Intelligent Power Limited, Dublin (IE)

(72) Inventors: William Robert Luoma, Franklin, WI (US); Richard Ralph Buell, South Milwaukee, WI (US); Ian William Rokser, Greenfield, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,626

(22) Filed: Sep. 10, 2018

(65) Prior Publication Data

US 2019/0006822 A1    Jan. 3, 2019

Related U.S. Application Data

(63) Continuation of application No. 15/343,040, filed on Nov. 3, 2016, now Pat. No. 10,096,978.

(51) Int. Cl.
*H02B 1/32* (2006.01)
*H02B 1/26* (2006.01)
(Continued)

(52) U.S. Cl.
CPC .............. *H02B 1/32* (2013.01); *H01H 9/02* (2013.01); *H02B 1/26* (2013.01); *H02B 5/00* (2013.01); *H02B 5/02* (2013.01); *H01H 33/008* (2013.01)

(58) Field of Classification Search
None
See application file for complete search history.

(56) References Cited

U.S. PATENT DOCUMENTS 4,049,933 A * 9/1977 Lovett .................. H01H 31/003
                                                                                               200/48 R
5,349,144 A    9/1994 Baragar
(Continued)

OTHER PUBLICATIONS

International Search Report and Written Opinion, counterpart PCT Application No. PCT/US2017/059004, dated Feb. 5, 2018, 12 pages total.

(Continued)

*Primary Examiner* — Courtney L Smith
(74) *Attorney, Agent, or Firm* — DiBerardino McGovern IP Group LLC

(57) ABSTRACT

A system for an electrical power distribution network includes a plurality of electrical apparatuses, each electrical apparatus including a mechanical connection and at least one electrical connector; and a single-piece unitary support configured to receive and hold the plurality of electrical apparatuses, the support including: a frame including a plurality of mechanical interfaces, each of the mechanical interfaces configured to receive and hold a mechanical connection of one of the plurality of electrical apparatus; a cover extending from a side of the frame; and a panel integrated with the frame, the panel including a plurality of electrical interfaces, each of the plurality of electrical interfaces configured to couple to an electrical connector of one of the electrical apparatuses, the cover positioned over the panel.

21 Claims, 10 Drawing Sheets

(51) Int. Cl.
*H01H 9/02* (2006.01)
*H02B 5/00* (2006.01)
*H02B 5/02* (2006.01)
*H01H 33/00* (2006.01)

(56) References Cited

U.S. PATENT DOCUMENTS

| | | | |
|---|---|---|---|
| 5,546,062 A * | 8/1996 | Duchemin | H01H 50/645 |
| | | | 335/105 |
| 5,612,661 A | 3/1997 | Twenter et al. | |
| 5,859,398 A | 1/1999 | McKean | |
| 6,525,274 B1 * | 2/2003 | Roberts | H01H 31/023 |
| | | | 174/138 G |
| 6,687,110 B2 | 2/2004 | Murray | |
| 6,936,779 B2 * | 8/2005 | Rhein | H01H 31/00 |
| | | | 200/48 KB |
| 7,133,271 B2 | 11/2006 | Jonas et al. | |
| 7,943,871 B2 * | 5/2011 | Crutcher | H01H 33/127 |
| | | | 200/17 R |
| 9,773,633 B2 * | 9/2017 | Jordan | H01H 85/202 |
| 10,096,978 B2 * | 10/2018 | Luoma | H02B 1/26 |
| 2002/0135964 A1 * | 9/2002 | Murray | H01H 33/6661 |
| | | | 361/131 |
| 2007/0295691 A1 | 12/2007 | Crutcher | |
| 2009/0091416 A1 | 4/2009 | Tang et al. | |
| 2012/0255920 A1 | 10/2012 | Shaw et al. | |
| 2014/0247542 A1 | 9/2014 | Fong et al. | |
| 2015/0236461 A1 | 8/2015 | Huang et al. | |
| 2018/0123326 A1 | 5/2018 | Luoma et al. | |

OTHER PUBLICATIONS

"NOVA(TM) three-phase, microprocessor-controlled recloser," Cooper Power Series, Reclosers Catalog Data CA280003EN, Effective Mar. 2015, 12 pages.

"MIL-DTL-38999 Series IV connectors and cable assemblies," EATON, CA800026EN, Dec. 2015, pp. 1-15.

"MIL-DTL-38999 TV, Tri-Start Series III," 38999-Series-and-Types, printed on Sep. 27, 2016, 1 page, http://www.amphenol-aerospace.com/38999-Series-and-Types/mil-dtl-3 . . . .

"Coordinated, dependable and precise automation," NOVA-TS Triple-Single Recloser System, Cooper Power Systems by EATON, PA280004EN, Dec. 2014, 2 pages.

"Viper Reclosers with Six Integral Voltage Sensors," G&W Electric Company, Catalog VIP6VS, Oct. 2012, 4 pages.

"Viper-ST Solid Dielectric, Triple Option Reclosers," G&W Electric Company, Catalog O-vst14, Nov. 2014, 12 pages.

* cited by examiner

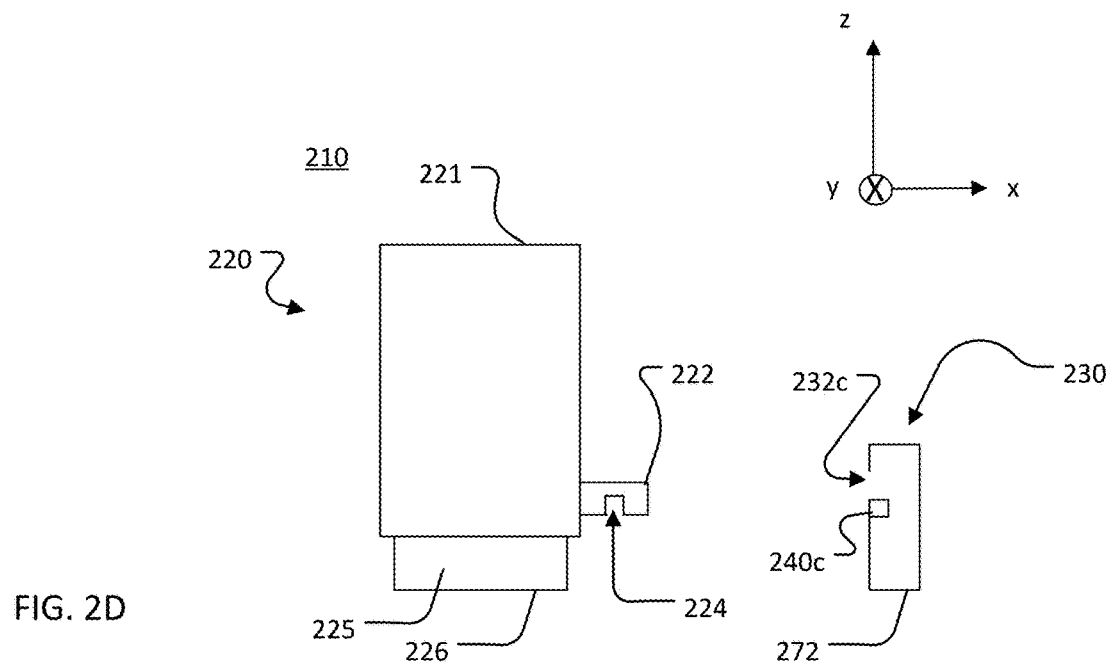
FIG. 2D
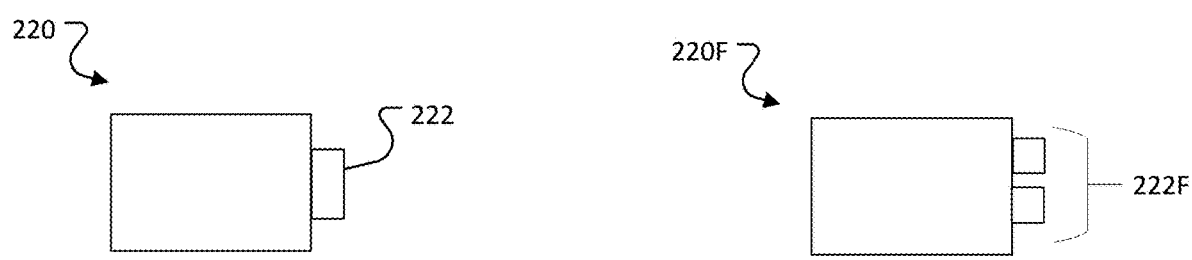
FIG. 2E
FIG. 2F

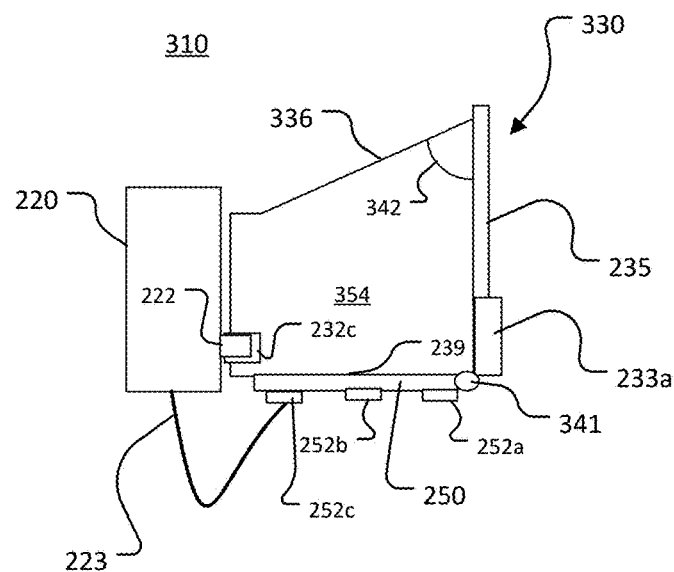
FIG. 3A
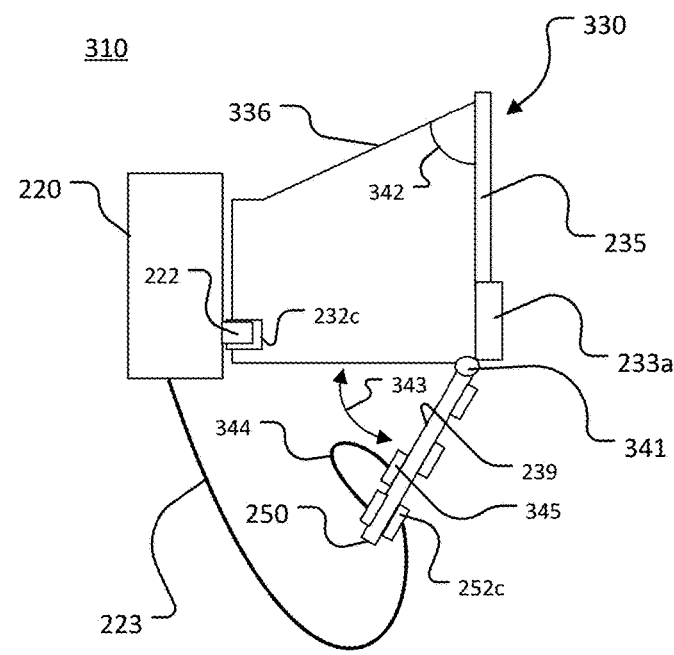
FIG. 3B
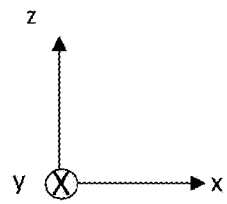

MOUNTABLE ELECTRICAL SYSTEM

CROSS-REFERENCE TO RELATED APPLICATION

This application is a continuation of U.S. patent application Ser. No. 15/343,040, filed Nov. 3, 2016 and titled MOUNTABLE ELECTRICAL SYSTEM, which is incorporated herein by reference in its entirety.

TECHNICAL FIELD

This disclosure relates to a mountable electrical system. The electrical system includes a support structure and an electrical apparatus (such as, for example, a recloser). The electrical system may be mounted, for example, on a utility pole of an electrical power distribution network.

BACKGROUND

Switchgears or reclosers may be used in an electrical power distribution network to protect the network from electrical fault conditions. Under normal operating conditions, the recloser is closed, and electrical current flows through the recloser. In response to detecting a fault condition, the recloser trips or opens to prevent current from flowing through the recloser, and then opens and closes a number of times. If the fault condition persists, the recloser remains open. If the fault condition clears, the recloser closes and the distribution network resumes normal operation. The recloser and/or other electrical apparatuses may be attached to a structure in the electrical power distribution network.

SUMMARY

In one general aspect, a system for an electrical power distribution network includes an electrical apparatus and a support. The electrical apparatus includes a mechanical connection and at least one electrical connector. The support is configured to hold the electrical apparatus at the mechanical connection. The support includes: a frame including a mechanical interface configured to couple to the mechanical connection of the electrical apparatus; a bracket connected to the frame, the bracket including a first side and a second side; a housing including a top portion and at least two side portions, the top portion extending from the first side of the bracket, and each side portion extending from the top portion in a first direction; and an electrical panel integrated with the support and including at least one electrical interface on an exterior of the housing, the electrical panel being received between two of the side portions of the housing, the electrical panel being separated from the top portion of the housing in the first direction, the at least one electrical interface of the electrical panel configured to electrically couple to the at least one electrical connector of the electrical apparatus.

Implementations may include one or more of the following features. The top portion of the housing may have a substantially flat section that extends from the first side of the bracket at an angle. The angle may be less than 90 degrees. The electrical apparatus may include a recloser. The recloser may include a recloser housing, and the mechanical connection may be on the recloser housing. In some implementations, when the mechanical connection is received in the mechanical interface, a bottom portion of the recloser housing is aligned with a bottom portion of the support such that the bottom portion of the recloser and the bottom portion of the support are in substantially the same plane.

The electrical connector may be an electrical cable.

The panel may be held in a fixed position between the two of the side portions of the housing.

One end of the panel may be hingedly connected to at least one of the two side portions of the housing or the frame.

The mechanical connection of the electrical apparatus may include a connection block that defines one or more notches, and the mechanical interface of the frame may include an opening that receives the connection block, at least one of the one or more notches of the connection block latching onto an edge of the opening of the frame.

The mechanical connection of the electrical apparatus may include an opening, and the mechanical interface of the frame may include a connection block that is configured to be received in the opening of the electrical apparatus, the connection block may define one or more notches, at least one of the one or more notches of the connection block latching onto an edge of the opening of the electrical apparatus.

The second side of the bracket may define a channel configured to receive a utility pole.

One or more posts may extend from the frame in the first direction, and the post may be configured to hold the system upright.

The mechanical connection of the electrical apparatus may removable from the mechanical interface of the frame.

The system also may include an electrical component in an interior of the housing. The interior of the housing may be between the top portion and the panel, and the electrical component may electrically connected to the electrical interface through the panel.

The frame, bracket, and the housing may be a single, unitary piece.

In another general aspect, a system for an electrical power distribution network includes a plurality of electrical apparatuses, each electrical apparatus including a mechanical connection and at least one electrical connector; and a support configured to receive and hold the plurality of electrical apparatuses. The support includes: a frame that includes a plurality of mechanical interfaces, each of the mechanical interfaces configured to receive and hold a mechanical connection of one of the plurality of electrical apparatus; a housing extending from a first side of the frame toward a second side of the frame, the housing including a top portion and at least two side portions extending from the top portion in a first direction; and a panel received in the housing and separated from the top portion in the first direction, the panel including a first side configured to face to an exterior of the housing and a second side configured to face an interior of the housing, the first side of the panel including a plurality of electrical interfaces, each of the plurality of electrical interfaces configured to couple to an electrical connector of one of the plurality of electrical apparatuses, where the plurality of mechanical interfaces are positioned on the frame such that the plurality of electrical apparatuses are mountable on the support relative to each other in at least two different spatial arrangements.

In some implementations, the plurality of electrical apparatuses include at least one recloser. The plurality of electrical apparatuses may include at least one transformer.

In another general aspect, a system for an electrical power distribution network includes a plurality of electrical apparatuses, each electrical apparatus including a mechanical connection and at least one electrical connector; and a single-piece unitary support configured to receive and hold the plurality of electrical apparatuses. The support includes: a frame including a plurality of mechanical interfaces, each of the mechanical interfaces configured to receive and hold a mechanical connection of one of the plurality of electrical apparatus; a cover extending from a side of the frame; and a panel integrated with the frame, the panel including a plurality of electrical interfaces, each of the plurality of electrical interfaces configured to couple to an electrical connector of one of the electrical apparatuses, the cover positioned over the panel.

In some implementations, the cover includes a substantially flat portion, and the substantially flat portion of the cover extends from the side of the frame and is angled toward the panel.

Implementations of any of the techniques described herein may include an apparatus, a system that includes an electrical apparatus and a support structure with an integrated electrical panel, a replaceable electrical panel, an electrical apparatus, a support structure, a kit for retrofitting an electrical apparatus, and/or a method. The details of one or more implementations are set forth in the accompanying drawings and the description below. Other features will be apparent from the description and drawings, and from the claims.

DRAWING DESCRIPTION

FIG. 2D is a side cross-sectional view of the electrical apparatus of FIGS. 2A and 2C and a partial cross-sectional view of the support structure of FIGS. 2A and 2C.

FIGS. 2E and 2F are top views of exemplary electrical apparatuses.

FIGS. 3A and 3B are a side cross-sectional views of an exemplary mountable electrical system in an assembled state.

DETAILED DESCRIPTION

A field-ready mountable electrical system is disclosed. The mountable electrical system includes a support structure, which may be mounted to a utility pole or other assembly in an electrical power distribution network, and an electrical apparatus, which is attachable to the support structure. An electrical panel configured for electrical connection to the electrical apparatus is integrated or incorporated into the support structure. As discussed below, integration of the electrical panel into the support structure provides environmental protection for the electrical panel.

Figure 1:
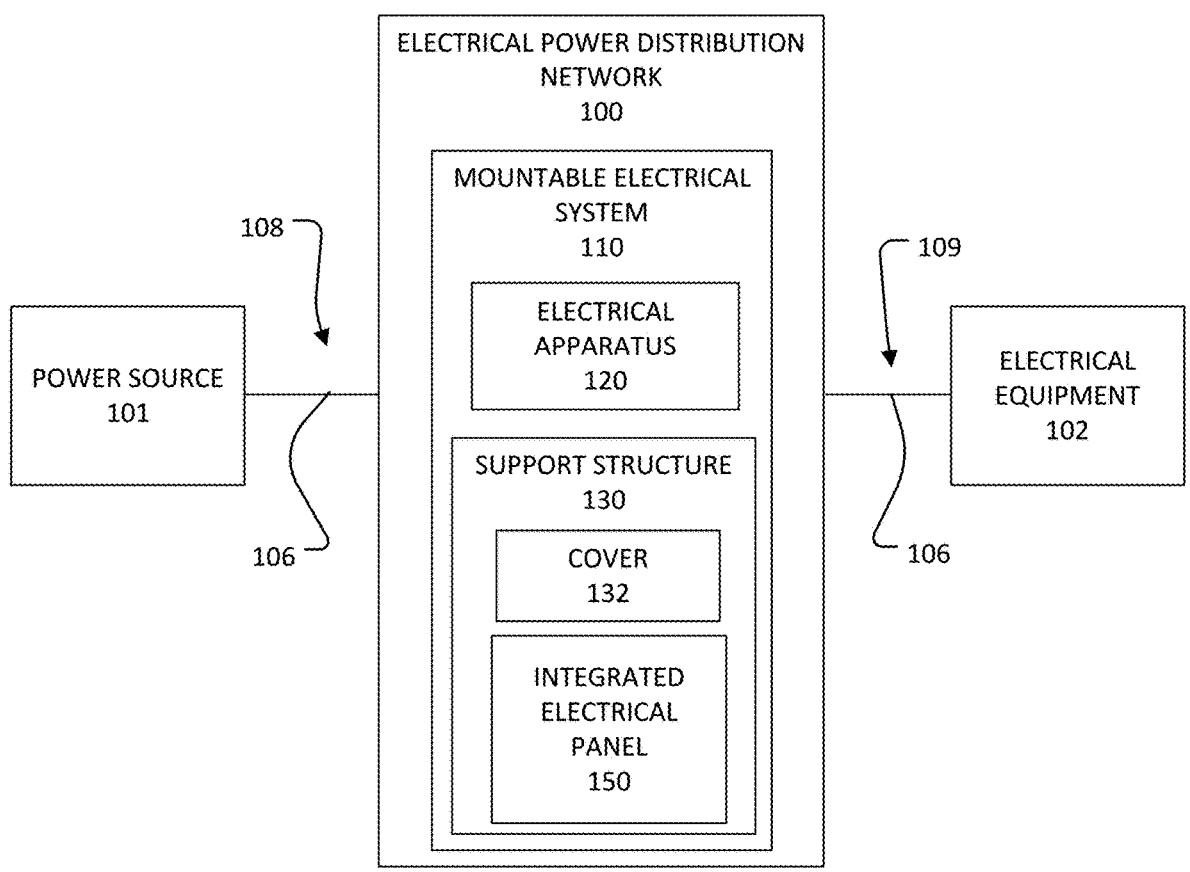
FIG. 1 is a block diagram of an electrical power distribution network that includes a mountable electrical system.

Referring to FIG. 1, a block diagram of an example electrical power distribution network 100, which includes a mountable electrical system 110, is shown. The mountable electrical system 110 includes an electrical apparatus 120 and a support structure 130. The electrical apparatus 120 may be, for example, a switchgear, a single-phase recloser, a triple single recloser (which may be, for example, three single-phase reclosers that are each configured to control one phase of a three-phase system with one common electronic control for all three reclosers), a three-phase recloser (which may include, for example, an interrupting mechanism that is able to interrupt current in all three phases simultaneously), a transformer, a capacitor switch, a sectionalizer switch, a distribution automated switch, a circuit breaker, or a fuse assembly. The support structure 130 holds the electrical apparatus 120 and also mounts or attaches to a structure in the electrical power distribution network 100. For example, the support structure 130 may be mounted to a utility pole on which transmission lines and other equipment are also mounted. In some implementations, the support structure 130 is mounted to or placed on a pad or slab in a sub station.

The support structure 130 includes a cover 132 and an integrated electrical panel 150. The integrated electrical panel 150 is incorporated into the support structure 130 and is part of the support structure 130. Thus, the support structure 130 provides the functionality of an electrical connection system that receives electrical connections from the electrical apparatus 120, such as a junction box, and also acts as a physical support that holds the electrical apparatus 120 in place in the electrical power distribution network 100. Moreover, although the electrical panel 150 is incorporated or integrated into the support structure 130, the electrical panel 150 may be removable or replaceable.

The electrical panel 150 is positioned in the support structure 130 relative to the cover 132 such that the cover 132 provides environmental protection to the electrical panel 150. For example, the cover 132 protects the electrical panel 150 from rain and snow, thus increasing the life and reliability of the electrical panel 150. Additionally, incorporating the electrical panel 150 into the support structure 130 allows the electrical panel 150 to be positioned in a manner that provides an operator with access the electrical panel 150. Furthermore, in some implementations, the cover 132 is tilted to discourage wildlife from nesting on the support structure 130.

The electrical power distribution network 100 may be any network that transfers electricity from a power source 101 to electrical equipment 102. The electrical power distribution network 100 may be, for example, an electrical grid, an electrical system, or a multi-phase electrical network that provides electricity to commercial and/or residential customers. The power distribution network 100 may have an operating voltage of, for example, at least 1 kilovolt (kV), up to 34.5 kV, up to 38 kV, up to 69 kV, or 69 kV or higher. The power distribution network 100 may operate at a fundamental frequency of, for example, 50-60 Hertz (Hz).

The power source 101 may be any source of electrical power. The electrical equipment 102 may be any electrical equipment that receives electricity from the power source 101 and may include electrical equipment that receives and transfers or distributes electricity to other equipment in the power distribution network 100. For example, the electrical equipment 102 may include transformers, fuses, electrical machinery in a manufacturing facility, and/or electrical appliances and devices in a residential building.

The power distribution network 100 transports electricity from a first portion 108 of the network 100 to a second portion 109 of the network via a transmission path 106. The transmission path 106 may include, for example, one or more transmission lines, electrical cables, wireless transmission paths, and/or any other mechanism for transmitting electricity. The electrical apparatus 120 may be a recloser that includes an interrupting module (such as, for example, a vacuum interrupter) that is capable of interrupting (opening) and closing the transmission path 106. In the example in which the electrical apparatus 120 is a recloser, the flow of electricity between the first portion 108 and the second portion 109 is controlled by the electrical apparatus 120 and associated electronic. The associated controls may include electronic controls (such as the control system 587 of FIG. 5) and/or mechanical controls (for example, actuators, springs, hydraulics, and other mechanical components that may be configured to drive various subsystems of the electrical apparatus 120).

Figure 2A:
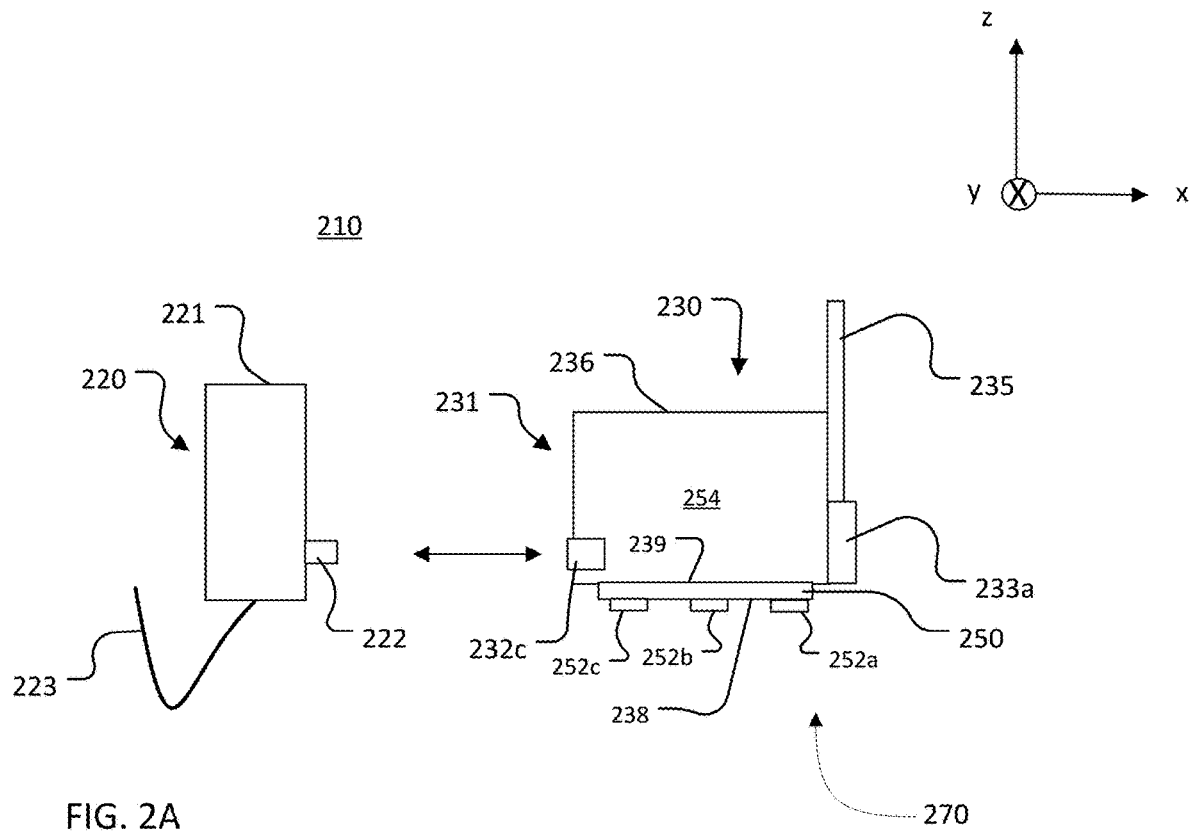
FIG. 2A is a side cross-sectional block diagram of an exemplary mountable electrical system in a disassembled state.
Figure 2B:
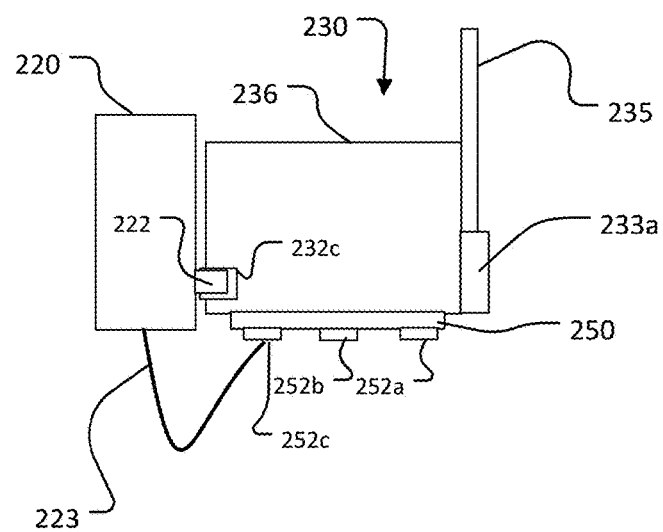
FIG. 2B is a side cross-sectional block diagram of the exemplary mountable electrical system of FIG. 2A in an assembled state.
Figure 2C:
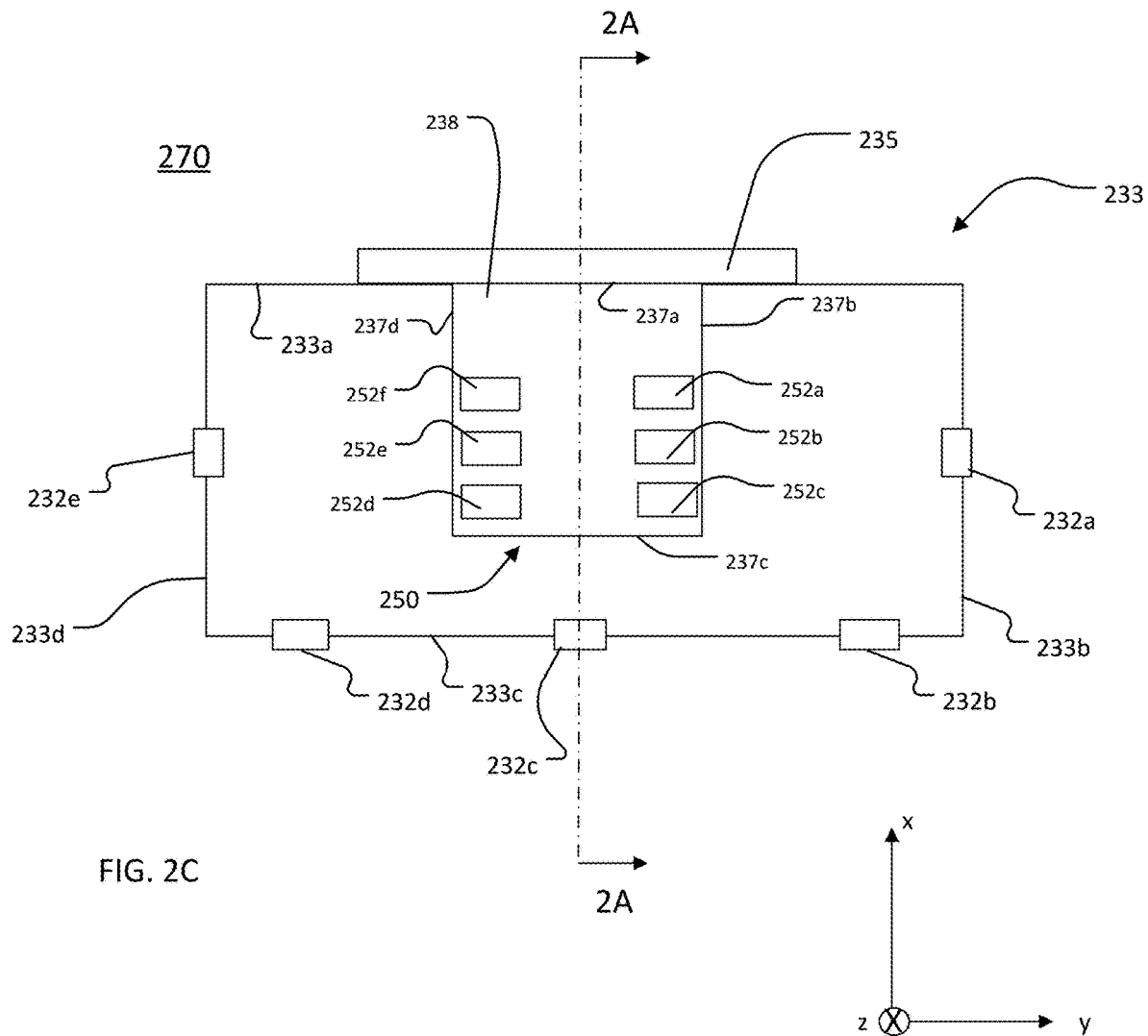
FIG. 2C is a block diagram of an underside of a support structure of the mountable electrical system of FIGS. 2A and 2B.

FIGS. 2A-2C are block diagrams of an electrical system 210. The electrical system 210 is an example of an implementation of the electrical system 110. The electrical system 210 may be used in the electrical power distribution network 100 (FIG. 1). FIGS. 2A and 2B are side cross-sectional block diagrams of the electrical system 210. FIG. 2C is a block diagram of an underside 270 of a support structure 230. The underside 270 is substantially in the x-y plane. The cross-sections of the support structure 230 shown in FIGS. 2A and 2B are in the x-z plane taken along the line 2A-2A, which is shown in FIG. 2C.

The electrical system includes an electrical apparatus 220 and the support structure 230. The electrical apparatus 220 may be, for example, a recloser. The electrical apparatus 220 includes a mechanical connection 222, which is used to attach the electrical apparatus 220 to the support structure 230. FIG. 2A shows the electrical system 210 in a disassembled state in which the electrical apparatus 220 is not held by the support structure 230. FIG. 2B shows the electrical system 210 in an assembled state in which the electrical apparatus 220 is held by the support structure 230.

Referring also to FIG. 2C, the support structure 230 includes a plurality of mechanical interfaces 232a-232e. When the mechanical connection 222 is coupled to one of the mechanical interfaces 232a-232e, the electrical apparatus 220 is connected to the support structure 230. FIG. 2B shows an example of the mechanical connection 222 connected to the mechanical interface 232c. The mechanical connection 222 may be repeatedly connected and disconnected to any of the mechanical interfaces 232a-232e without damaging either the mechanical connection 222 or the mechanical interfaces 232a-232e. In the example of FIGS. 2A-2C, the mechanical connection 222 is a connection block that extends from a housing 221 of the electrical apparatus 220, and the mechanical interface 232c is an opening that receives the connection block 222 of the electrical apparatus 220.

The support structure 230 includes a housing 231, a frame 233 (which includes portions 233a-233d), and a bracket 235. The bracket 235 may be used to mount the support structure 230 to a utility pole, post, or other structure in the electrical power distribution network 100. The housing 231 includes a top portion or cover 236 and side portions 237a-237d (FIG. 2C) that extend from the cover 236 along the −z direction. In the example of FIGS. 2A-2C, the cover 236 is in the x-y plane and extends from the bracket 235 at a right angle (90°). However, in some implementations (such as shown in FIGS. 3A and 3B), the cover is angled relative to the bracket 235 at an angle other than 90°. In the example of FIGS. 2A-2C, each side portion 237a-237d extends in the −z direction from one side of the cover 236, with one side portion extending from each side of the cover 236. In other examples, one or more of the side portions 237a-237d extend from the cover 236 at an angle and in a direction other than the −z direction. The bracket 235 may form all or a part of one of the side portions 237a-237d.

The support structure 230 also includes an electrical panel 250, which has an outer side 238 and an inner side 239. The electrical panel 250 is integrated into the support structure 230. However, the electrical panel 250 may be removable such that the electrical panel 250 may be replaced as needed. For example, the electrical panel 250 may be held securely to the support structure 230 by screws or other fasteners such that the electrical panel 250 is part of and is integrated with the support structure 230 during use yet still may be removed and/or replaced by an operator of the electrical system 210.

The electrical panel 250 is separated from the cover 236 along the z direction. Together, the top portion 236 and the side portions 237a-237d form the housing 231 and define a space 254. The space 254 may be completely or partially enclosed by the side portions 237a-237d, the cover 236, and the panel 250. In some implementations, side portions extend from fewer than all of the sides of the cover 236 and the space 254 is partially enclosed. In other implementations, the side portions 237a-237d are not included in the support structure 230, and the space 254 is a partially enclosed region between the cover 236 and the panel 250. In some implementations, the cover 236 may form all or part of the side portion 237c.

The outer side 238 includes electrical interfaces 252a-252f, which are accessible from an exterior of the housing 231. The electrical apparatus 220 includes an electrical connector 223, which electrically connects to one of the electrical interfaces 252a-252f. The electrical interfaces 252a-252f also may be capable of electrically connecting to connectors other than the electrical connector 223. For example, some or all of the electrical interfaces 252a-252f may be configured to electrically connect to a control cable such as the control cable 586 of FIG. 5. The electrical connector 223 may be, for example, a cable that carries electrical power, data, and/or control signals to the electrical apparatus 220. The electrical interfaces 252a-252f may be any kind of electrical interface capable of connecting to the electrical connector 223, including, for example, a 3-prong outlet; a 38999 Series IV general purpose connector available from the Eaton Corporation of Cleveland, Ohio; a recessed electrical connector, and/or a circular connector such as, for example, a 38999 Series III or a 5015 Series II connector available from Amphenol Aerospace of Sidney, N.Y. In some implementations, the electrical interfaces 252a-252f may be interfaces that are configured to be hardwired to the electrical connector 223.

The electrical interfaces 252a-252f be may mounted in the electrical panel 250 such that the interfaces 252a-252f are able to electrically connect to one or more components that are in or exposed to the space 254. For example, any of the electrical interfaces 252a-252f may pass through the panel 250 to provide an electrical connection to components (such as electrical connectors, electrical devices, and switches) mounted on the inner side 239 of the electrical panel 250. Moreover, one or more of the electrical interfaces 252a-252f may be electrically connected to another of the electrical interfaces 252a-252f. For example, the components at the inner side 239 may include a wire that connects one or more electrical interface.

In the example shown in FIGS. 2A-2C, the electrical panel 250 includes six electrical interfaces 252a-252f arranged in a regular grid. The six electrical interfaces 252a-252f may all be the same type of interface or the electrical interfaces 252a-252f may include more than one type of interface. The electrical panel 250 may include more or fewer than six electrical interfaces, and the electrical interfaces may be arranged on the electrical panel 250 in a manner other than the manner shown in the example of FIG. 2C. Additionally, in the example shown in FIGS. 2A-2C, the electrical panel 250 is substantially in the x-y plane and extends from the bracket 235 and/or the frame portion 233a at 90°. However, in other implementations, the electrical panel 250 may form an angle with the bracket 235 and/or the frame portion 233a that is other than 90°. For example, the electrical panel 250 may be tilted toward the cover 236 such that the angle between the electrical panel 250 and the bracket 235 and/or frame portion 233a is less than 90°. In some implementations, the electrical panel 250 may be tilted such that the angle between the electrical panel 250 and the bracket 235 and/or the frame portion 233a is 85°. Tilting the panel 250 in this manner may provide improved performance. For example, tilting the panel 250 may allow moisture that collects in the housing 231 to flow out of the housing 231 and away from the panel 250.

The frame 233 is connected to the bracket 235. In the example of FIG. 2C, the frame 233 and the bracket 235 form a perimeter around the electrical panel 250 in the x-y plane. The frame includes portions 233a-233d. The portion 233a is connected to the bracket 235, each of the portions 233b and 233d extend from one end of the frame portion 233a, and the frame portion 233c extends between the frame portions 233b and 233d. The frame 233 also includes a plurality of mechanical interfaces 232a-232e. The mechanical interface 232a is in the frame portion 233b, the mechanical interfaces 232b-232d are in the portion 233c, and the mechanical interface 232e is in the frame portion 233d.

The mechanical interfaces 232a-232e may be any mechanical interface capable of physical connection with the mechanical connection 222 of the electrical apparatus 220. For example, the mechanical interfaces 232a-232e may be openings that are formed in the respective portion of the frame 233. The openings may be cut-outs that pass through the respective portion of the frame 233. The openings may have a lip or edge that latches onto a corresponding notch in the mechanical connection 222. Referring also FIG. 2D, an example of such a configuration is shown. FIG. 2D is a side view of the electrical apparatus 220 and a partial side view of the support structure 230. In the example of FIG. 2D, the mechanical interface 232c is an opening. A lip or edge 240c is formed at a perimeter of the opening. The mechanical connection 222 defines a notch 224. In the example of FIG. 2D, the notch 224 is oriented down (facing the −z direction in FIG. 2D). To connect the electrical apparatus 220 to the support structure 230, the mechanical connection 222 is inserted into the opening and the notch 224 receives the lip 240c. The mechanical connection 222 is held in the opening by a physical engagement between the notch 224 and the lip 240c. The electrical apparatus 220 is held to the support structure 230 securely until being intentionally removed by, for example, an operator of the system 210. To remove the electrical apparatus 220 from the support structure 230, the electrical apparatus 220 is moved in the z direction to disengage the notch 224 and the lip 240c and the mechanical connection 222 is removed from the opening.

The configuration shown in FIG. 2D is an example, and other configurations of the mechanical connection 222 and the mechanical interface 232c are possible. For example, in some implementations, more than one notch 224 is formed in the mechanical connection 222 and more than one corresponding lip 240c is formed in the support structure 230. In the example of FIG. 2D, the lip 240c is formed on a bottom edge of the mechanical interface 232c. However, the lip may be formed on other edges of a mechanical interface. In some implementations, the housing 221 of the electrical apparatus 220 includes a recess instead of the connection block 222. In these implementations, the mechanical interface of the support structure 230 includes a connection block with a notch (similar to the connection block 222 and notch 224 shown in FIG. 2D). In this implementation, the notch may be oriented up (facing the z direction in FIG. 2D) as opposed to the example notch 224, which is oriented down (facing the −z direction in FIG. 2D).

The mechanical connection 232c is shown in FIG. 2D for illustration, and the other mechanical interfaces 232a, 232b, 232d, and 232e may be the same or different than the mechanical interface 232c. For example, the mechanical interfaces 232a-232e may be connection blocks that protrude from the respective portion of the frame 233. In these implementations, the connection blocks are received and held in by the mechanical connection 222 (which are corresponding openings in this example) of the electrical apparatus 220. The mechanical interfaces 232a-232e may be configured to allow the electrical apparatus 220 to be removed and reconnected by an end user, installer, or operator of the system 210. However, regardless of their configuration, all of the mechanical interfaces 232a-232e provide a connection point for mounting an electrical apparatus on the support structure 230.

Furthermore, the mechanical connection 222 and/or the mechanical interfaces 232a-232e may have subcomponents. FIGS. 2E and 2F are, respectively, top views of a block diagram of the electrical apparatus 220 and an electrical apparatus 220F. FIGS. 2E and 2F show example implementations of the mechanical connection 222. The electrical apparatus 220 of FIG. 2E has a single connection block as the mechanical connection 222. The electrical apparatus 220F has a mechanical connection 222F, which is formed from two connection blocks. Other configurations are also possible.

Additionally, in some implementations, the support structure 230 and the electrical apparatus 220 act together to form a self-aligning structure. The electrical apparatus 220 may include a base portion 225 (FIG. 2D), which has an end surface 226. When the electrical apparatus 220 is connected to the support structure 230 at any of the mechanical connections 232a-232e, the end surface 226 is aligned with an end 272 (FIG. 2D) of the support structure 230. The end surface 226 may be aligned with the end 272 when the end surface 226 and the end 272 form a line in the x-y plane. In other words, the end surface 226 and the end 272 are in the same plane (the x-y plane in this example). The end surface 226 and the end 272 may be considered to be aligned with each other when the end surface 226 and the end 272 are in planes that are displaced from each other in the z direction by, for example, no more than about 1 centimeter (cm).

Aligning the end 272 and the end surface 226 may allow the system 210 to be packaged and/or transported more easily and with a lower risk of damage as compared to a system 210 that is not self-aligning. Moreover, the self-aligning system 210 may be more compact than other systems and when assembled (or field-ready) may fit into, for example, a space (such as a shipping pallet) having a volume of 48×46×48 inches (121.9×116.8×121.9 cm). The self-aligning nature of the electrical apparatus 220 and the support structure 230 also may make assembly in the field easier and less error-prone as compared to a system that is not self-aligning.

Figure 7A:
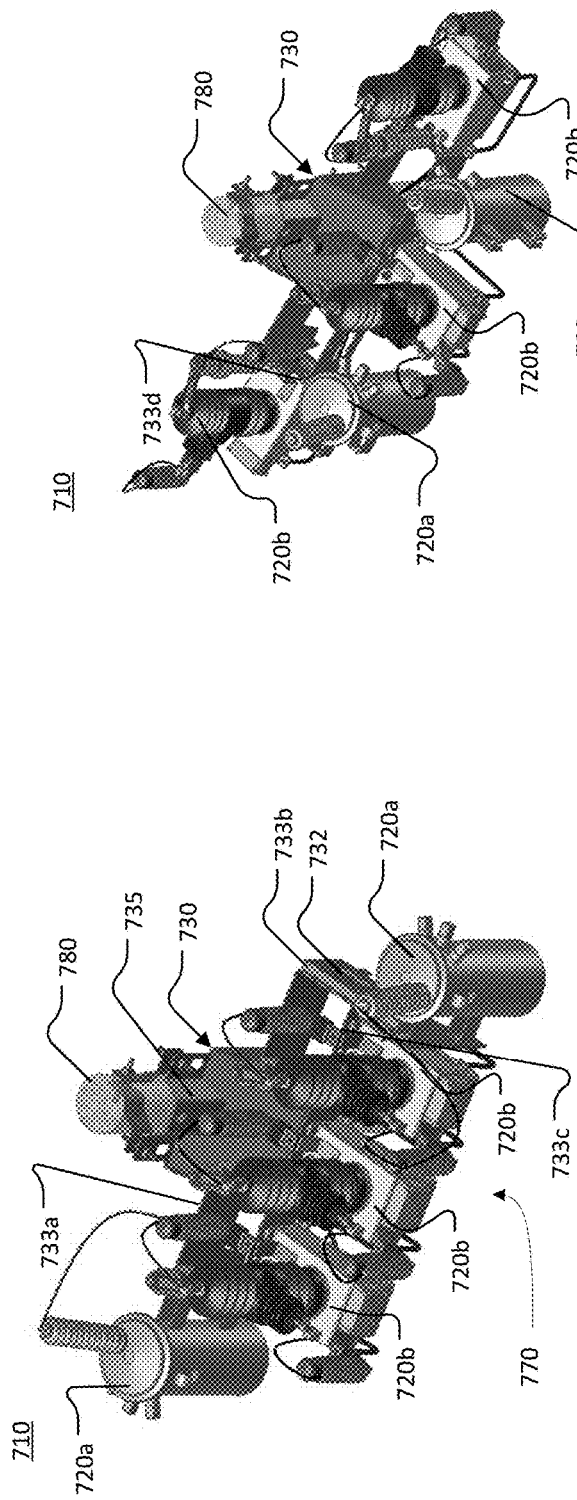
FIGS. 7A and 7B are perspective views of two different spatial arrangements of electrical apparatuses on a support structure.
Figure 7B:
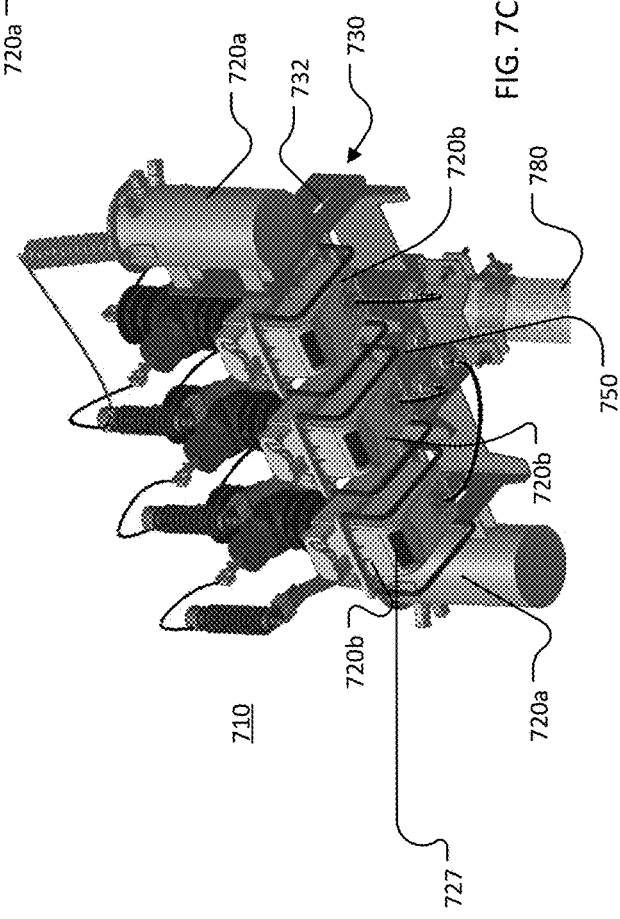

Referring again to FIGS. 2A-2C, the mechanical interfaces 232a-232e are arranged relative to each other such that the support structure 230 is able to hold more than one electrical apparatus at the same time. In the example of FIG. 2C, the mechanical interfaces 232a-232e are aligned with each other in the x-y plane. For example, the mechanical interfaces 232a-232e may be openings that pass through the respective portion of the frame 233. In this example, the mechanical interfaces 232a-232e may be aligned in the x-y plane by, for example, the center of each opening defining a plane that is contained in the x-y plane. The mechanical interfaces 232b-232d, which are in the portion 233b, may be equally spaced from each other along the y direction. Additionally, the mechanical interfaces 232a-232e are arranged such that a single frame may be used to hold electrical apparatuses in different configurations. FIGS. 7A and 7B, which are discussed below, show a collection of electrical apparatus being held in two different configurations.

The panel 250 may be positioned in the frame 233 relative to the mechanical interfaces 232a-232e such that the distance between the panel 250 and any of the mechanical interfaces 232a-232e is minimized. For example, a line that extends in the x direction and passes through the center of the panel 250 may be coincident with a line that extends in the x direction and passes through the center of the frame 233. In this way, the electrical connector 223 may reach at least one of the electrical interfaces 252a-252f regardless of which mechanical interface 232a-232e is used to mount the electrical apparatus 220 to the support structure 230.

A typical junction box is not integrated or incorporated into a frame, structure, or other apparatus that also holds electrical equipment. Thus, a typical junction box is generally attached to a utility pole or other structure separately from the apparatus that holds the electrical equipment. As compared to a junction box or other connection system that is not integrated or incorporated into a frame, the support structure 230 and the electrical panel 250 provide less complex and more reliable electrical connections to electrical apparatuses that are attached to the support structure 230. Additionally, the placement of the electrical interfaces 252a-252f on the outer side 238 of the panel 250 allows an operator to easily access the electrical interfaces 252a-252f for installation, maintenance, troubleshooting, or other activities. Further, the electrical panel 250 may provide a central location for grounding of electrical apparatuses that are attached to the support structure 230. Moreover, because the panel 250 is below (in the −z direction of FIGS. 2A and 2B) the cover 236, the cover 236 provides environmental protection to the panel 250.

FIGS. 3A and 3B are side cross-sectional block diagrams of an example mountable electrical system 310. The mountable electrical system 310 is an example of an implementation of the electrical system 210 (FIGS. 2A-2C). The electrical system 310 may be used in the electrical power distribution network 100 of FIG. 1.

The mountable electrical system 310 includes the electrical apparatus 220 and a support structure 330 that holds the electrical apparatus 220. The support structure 330 is the same as the support structure 230 (FIGS. 2A-2C), except the support structure 330 includes a cover 336 that is slanted at an angle 342 relative to the bracket 235. The angle 342 may be between, for example, 45° and 65°. The slant of the cover 336 may discourage or prevent wildlife from nesting on the support structure 330. A space 354 is defined by the cover 336, side portions 237a-237d (which have different extents in the z direction in the example of FIGS. 3A and 3B), and the electrical panel 250.

In the example of FIGS. 3A and 3B, the electrical panel 250 is connected to the bracket 235 and/or the frame portion 233a via a pivot 341. The pivot 341 allows the panel 250 to move along an arc 343 (FIG. 3B). The pivot 341 may be any element that allows the panel 250 to move along the arc 343 between a closed position (FIG. 3A) and an open position (FIG. 3B). For example, the pivot 341 may be a hinge. In some implementations, the pivot 341 is a shoulder bolt or a retained pin. In some implementations, the panel 250 is attached to the bracket 235, the frame portion 233a, and/or one or more of the sides 237b-237d with bolts. Removing or loosening the bolts from all but one side allows the panel 250 to open. For example, the panel 250 may be attached to the bracket 235 with two bolts and to the side 237c with two bolts. Removing or loosening the bolts at the side 237c allows the panel 250 to move along the arc 343. Removing or loosening the bolts at the bracket 235 allows the panel 250 to pivot along an arc (not shown) that is about the side 237c.

In the closed position, the inner side 239 of the control panel 250 faces the space 354. When in the closed position, the panel 250 may be moved along the arc 343 to the open position by, for example, applying a force in the −z direction to the panel 250. The force may be applied by an operator of the system 310. When in the open position, the inner side 239 of the panel 250 is exposed an exterior of the support structure 330. Exposing the inner side 239 allows the operator to perform maintenance, troubleshoot, or upgrade components 344 and 345 of the panel 250 or the panel 250 itself. In the example shown, the component 344 is a wire and the component 345 is an interface that is electrically connected to the electrical interface 252b. Thus, the electrical interface 252b and the electrical interface 252c are connected to each other by the wire 344. In this configuration, the electrical interface 252b may be used to connect the electrical apparatus 220 to a control cable (such as the control cable 586 of FIG. 5) such that, when the electrical apparatus 220 is connected to the electrical interface 252c via the connector 223, electrical apparatus 220 also may be connected to a physically separate control system (such as the control system 587 of FIG. 5) that is connected to the panel 250 at the electrical interface 252b. To return the panel 250 to the closed position, the operator moves the panel 250 along the arc 343 to the position shown in FIG. 3A.

Figure 4A:
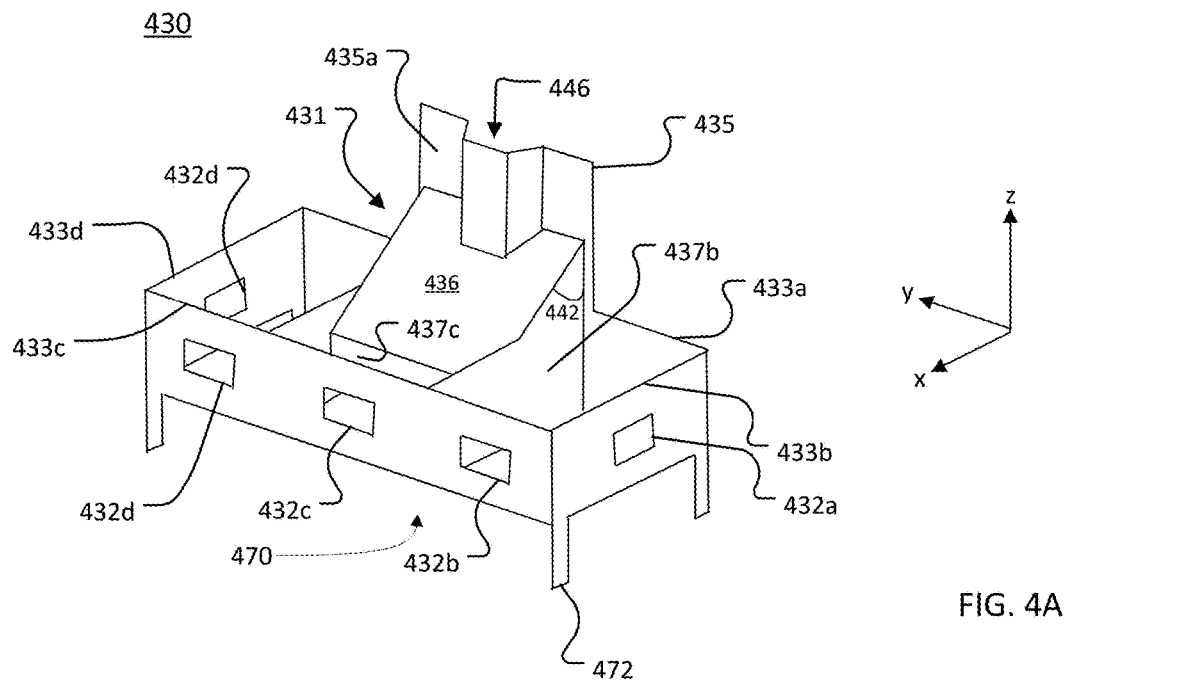
FIG. 4A is a perspective view of an exemplary support structure.
Figure 4B:
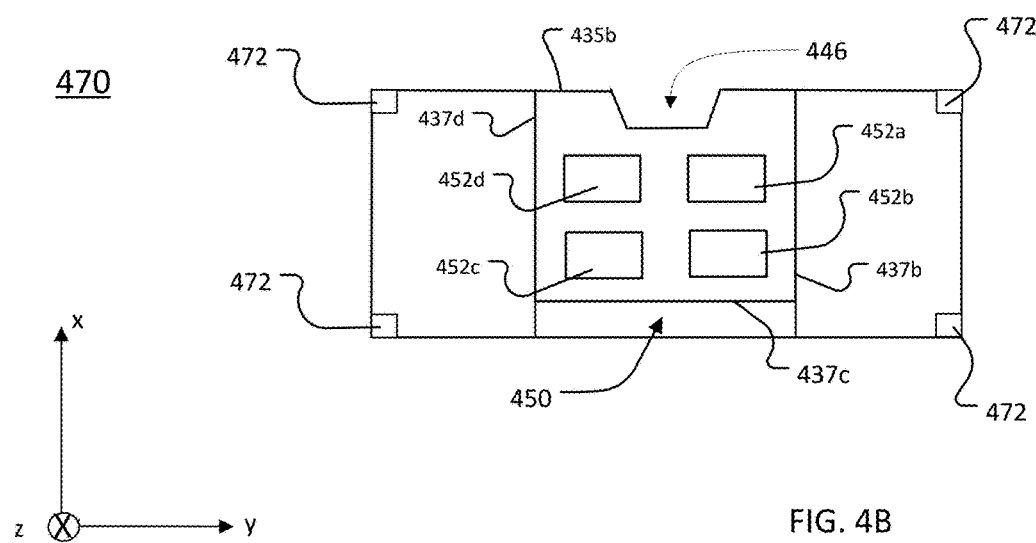
FIG. 4B is a block diagram of an underside of the support structure of FIG. 4A.

FIG. 4A is a perspective view of a support structure 430. The support structure 430 is an example of an implementation of the support structure 130, 230, or 330, and the support structure 430 may be used in the electrical power distribution network 100 of FIG. 1. FIG. 4B is a block diagram of an underside 470 of the support structure 430.

Figure 5:
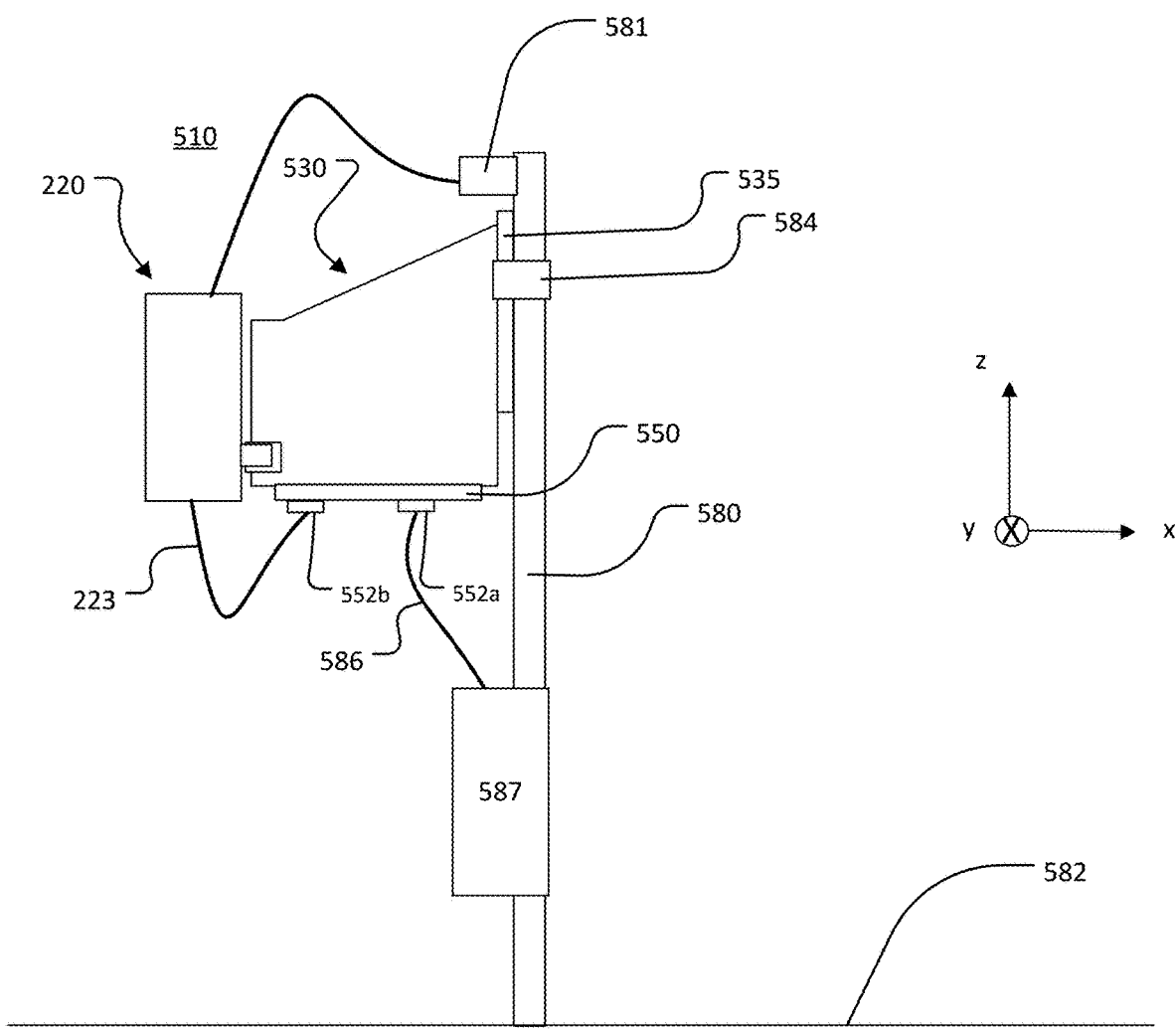
FIG. 5 is a block diagram of an exemplary electrical system attached to a utility pole.
Figure 6A:
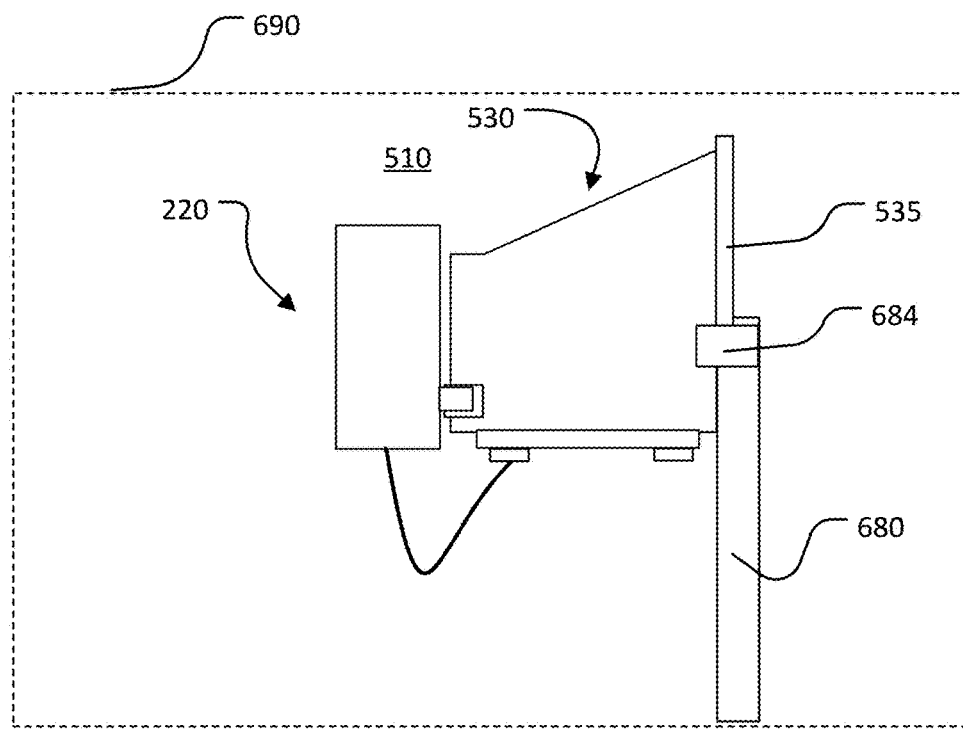
FIGS. 6A and 6B are block diagrams of an exemplary electrical system mounted in a sub station.

The support structure 430 includes a bracket 435 and frame portions 433a-433d. The bracket has a first side 435a and a second side 435b. The bracket 435 defines a channel 446 at the second side 435b. The channel 446 is sized to attach to a post or utility pole, and the channel 446 may be used to mount the support structure 430 to the post or utility pole. FIGS. 5 and 6A show examples of mounting a support frame to a post or utility pole at a channel similar to the channel 446.

Figure 6B:
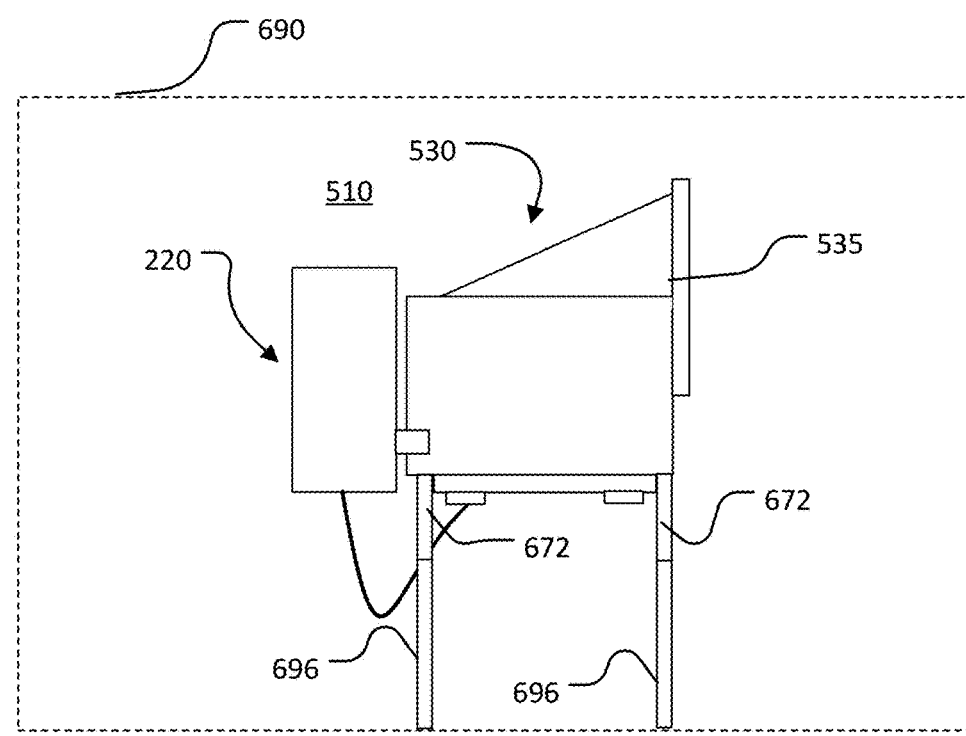

The frame portion 433a is connected to the bracket 435 and extends from the bracket 435 along the y direction. Each of the frame portions 433b and 433d extend from an end of the frame portion 433a, and the frame portion 433c extends between the frame portions 433b and 433d. Mechanical interfaces 432a-432e for connecting to corresponding mechanical connections on an electrical apparatus (such as the electrical apparatus 220 of FIG. 2A) are formed in the frame portions 433b-433d. Additionally, lower extensions 472 extend in the −z direction from an end of each of the frame portions 433a-433d. The lower extensions 472 may be used to mount or place the support frame on a surface, such as shown in FIG. 6B.

An electrical panel 450 is integrated into the underside 470 of the support structure 430. The electrical panel 450 includes electrical interfaces 452a-452d, each of which are configured to electrically connect to an electrical apparatus (such as the electrical apparatus 220 of FIG. 2A). Positioning the electrical panel 450 at the underside 470 of the support structure 430 provides the panel 450 with some protection from the environment (such as rain and wind) and also allows relatively easy access to the electrical interfaces 452a-452d. In some implementations, the panel 450 may be slanted at an angle relative to the bracket 435 to encourage moisture runoff. Additionally or alternatively, the panel 450 may be connected to the bracket 435 at a pivot connection so that the panel 450 may swing open for servicing. For example, the panel 450 may be connected to the bracket 435 with a connection such as the pivot 341 of FIGS. 3A and 3B.

A cover 436 extends from a first side 435a of the bracket 435 at an angle 442. The angle 442 is less than 90°, thus, the cover 436 slopes toward the underside 470 and the frame portion 433c. The angle 442 may be, for example, 45° to 65°. In the example of FIG. 4A, the cover 436 is substantially flat such that items and materials cannot rest on the cover 436. As such, the placement of the cover 436 at the angle 442 forms a flat, slanted surface that discourages wildlife from nesting on the support structure 430. Sides 437b-437d extend from the cover 436 in the −z direction. Together, the sides 437b-437d (and/or the bracket 435) and the cover 436 form a housing 431. The electrical interfaces 440a-440d may pass through the panel 450 and into an interior of the housing 431. In this way, the electrical interfaces 440a-440d may be protected from the environment.

Referring to FIG. 5, a mountable electrical system 510 is shown mounted to a utility pole 580. The mountable electrical system 510 includes the electrical apparatus 220 and a support structure 530. The support structure 530 is similar to the support structure 430 and includes an electrical panel 550 and a bracket 535, which is configured to receive the utility pole 580.

The utility pole 580 may be, for example, a concrete or wooden pole, or any other structure suitable for supporting an overhead transmission line 581. The utility pole 580 is positioned into the ground 582. The support structure 530 is mounted to the utility pole 580 at the bracket 535. The bracket 535 may include a channel (such as the channel 446 of FIGS. 4A and 4B) that receives and partially surrounds the utility pole 580. The bracket 535 may be secured to the utility pole 580 with a brace 584. The brace 584 connects to the bracket 535 and surrounds the portion of the utility pole 580 that is not surrounded by the bracket 535.

The electrical panel 550 includes electrical interfaces 552a and 552b. The electrical panel 550 may include more than two electrical interfaces, and the interfaces 552a and 552b are shown for illustration. The electrical connector 223 of the electrical apparatus 220 is electrically connected to the electrical interface 552b. In the example of FIG. 5, a control cable 586 is connected to the electrical interface 552a and to a control system 587. Although one control cable 586 is shown in the example of FIG. 5, more than one control cable may be used to connect the control system 587 to the electrical panel 550. The control system 587 is configured to generate command signals that, when provided to the electrical apparatus 220, are sufficient to control the electrical apparatus 220. For example, in implementations in which the electrical apparatus 220 is a recloser that includes a current interrupter, the command signal may cause the current interrupter to interrupt current in a transmission line supported by the utility pole 580 or to reclose to allow current to flow in the transmission line. The control system 587 may include an electronic processor, an electronic storage (for example, volatile and/or non-volatile memory capable of storing a computer program), and an input/output interface that allows an operator to interact with the control system 587 and/or the electrical apparatus 220. In addition to the command signals, the control system 587 may receive information from the electrical apparatus 220 and/or any other device connected to the panel 550 through the one or more control cables 586.

In the example of FIG. 5, the electrical interface 552a is internally connected to the electrical interface 552b such that connecting the electrical apparatus 220 to the electrical interface 552b via the electrical connection 223 and connecting the control system 587 to the electrical interface 552a via the control cable 586 allows the control system 587 to communicate with the electrical apparatus 220 (which is connected at the electrical interface 552b). As noted above, more than one control cable may be used. For example, in some implementations, the electrical interface 552a is not internally connected to the electrical interface 552b. In these implementations, one control cable may connect the electrical interface 552a to the control system 587 and a separate control cable may connect the electrical interface 552b to the control system 587.

In the example of FIG. 5, the control system 587 is mounted to the utility pole 580. However, other implementations are possible.

FIG. 6A shows the mountable electrical system 510 mounted to a post 680 in a substation 690. The mountable electrical system 510 is attached to the post 680 with a brace 684 that surrounds a portion of the post 680 and connects to the bracket 535. A control system (such as the control system 587 of FIG. 5) may be mounted on the post 680 and connected to the electrical apparatus 220. FIG. 6B shows the mountable electrical system 510 mounted in a free standing configuration in the substation 690. In this example, the system 510 is supported by extensions 696 that are connected to lower extensions 672. The lower extensions 672 may be similar to the lower extensions 472 of FIGS. 4A and 4B. In some implementations, the extensions 696 replace the lower extensions 672. A control system (such as the control system 587 of FIG. 5) may be mounted on the extensions 696 or in another location in the substation 690 and connected to the electrical apparatus 220 via one or more control cables (such as the control cable 686 of FIG. 5).

Figure 7C:
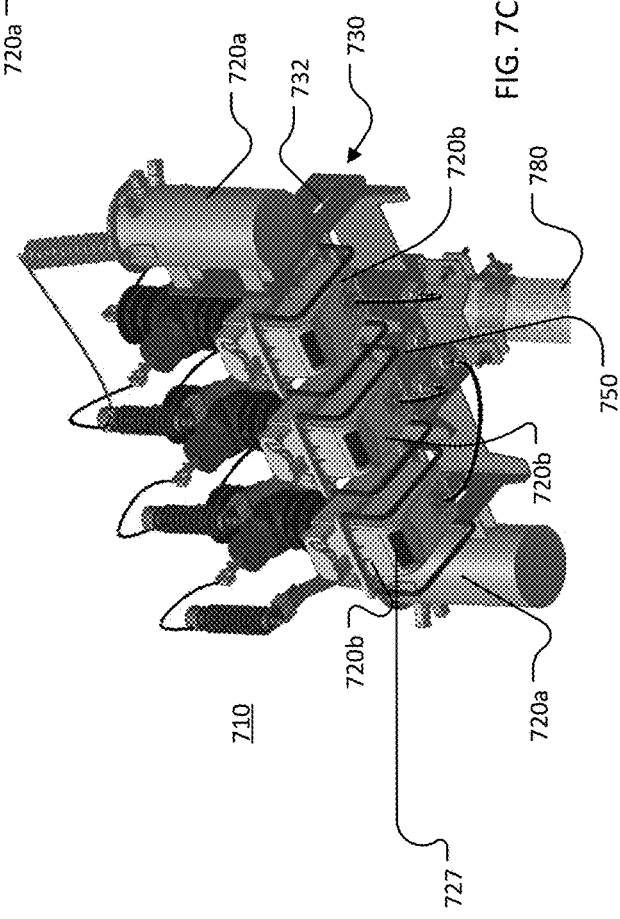
FIG. 7C is a bottom perspective view of the spatial arrangement of FIG. 7A.

The support structures 130, 230, 330, 430, and 530 are universal mounting systems in that the mechanical interfaces are arranged in the frame of the support structure to allow the electrical apparatuses to be connected in more than one configuration or spatial arrangement relative to each other without making any changes to the support structure. FIGS. 7A-7C are perspective views of a mountable electrical system 710 that is attached to a utility pole 780. The mountable electrical system 710 includes a support structure 730 and electrical apparatus 720a, 720b. FIGS. 7A and 7B show the support structure 730 being used to hold the electrical apparatuses 720a and 720b in two different configurations or spatial arrangements relative to each other. FIG. 7C is a view of an underside 770 of the system 710 when the electrical apparatuses 720a and 720b are arranged in the configuration shown in FIG. 7A.

The support structure 730 has features similar to those of the support structures 130, 230, 330, 430, and 530. For example, the support structure 730 includes a plurality of mechanical interfaces 732 (only one of which is labeled in FIGS. 7A and 7C). The support structure 730 also includes a bracket 735 and a frame, which includes frame portions 733a-733d. Frame portion 733a extends from the bracket 735, each of frame portions 733b and 733d extend from one end of the frame portion 733a, and the frame portion 733c extends between the frame portions 733b and 733d. In the example of FIGS. 7A-7B, at least three mechanical interfaces are formed in the frame portion 733c, and at least one mechanical interface is formed in each of the frame portions 733b and 733d. In other examples, fewer or more mechanical interfaces may be included in the frame portions 733b, 733c, 733d. For example, in some implementations, the frame portion 733c includes one mechanical interface.

In the examples of FIGS. 7A-7C, the electrical apparatus 720a are two transformers and the electrical apparatuses 720b are three current interrupters (for example, vacuum interrupters, circuit breakers, oil reclosers, or a combination of such devices). The electrical apparatus 720b may be a triple-single phase arrangement with a separate apparatus used for each of three phases. Other types of electrical apparatus also may be connected to the support structure 730. In the configuration shown in FIG. 7A, each of the three of the current interrupters 720b is attached to a mechanical interface in the frame portion 733c, one of the transformers 720a is attached to a mechanical interface in the frame portion 733b, and the other transformer 720a is attached to a mechanical interface in the frame portion 733d. Thus, the current interrupters 720b are positioned along the frame portion 733c in an "in-line" configuration.

In FIG. 7B, the support structure 730 is used to hold the electrical apparatus in a different configuration. One of the current interrupters 720b is attached to a mechanical interface in each of the frame portions 733b, 733c, 733d. The transformers 720a are attached to mechanical interfaces in the frame portion 733c, with one transformer 720a on either side of the current interrupter that is attached at the frame portion 733b. The configuration of FIG. 7B is a "cluster" configuration.

The same mechanical interfaces of the support structure 730 are used to attach the electrical apparatuses in the "in-line" configuration of FIG. 7A and in the "cluster" configuration of FIG. 7B. In this way, the support structure 730 is a universal mounting structure or system. The support structure 730 allows a plurality of electrical apparatuses to be connected, and the electrical apparatuses may be arranged spatially in more than one configuration without making physical changes to the support structure. Thus, the support structure 730 offers greater flexibility and reduced costs.

FIG. 7C is a perspective view of the underside 770 of the mountable electrical system 710 in the "in-line" configuration of FIG. 7A. As shown in FIG. 7C, the support structure 730 includes an electrical panel 750 that accepts electrical connections from the current interrupters 720b. The electrical panel 750 also may connect to other electrical apparatuses connected to the support structure 730, such as the transformers 720a. The electrical panel 750 also may be configured to connect to a control system (such as the control system 587 of FIG. 5) via one or more control cables (such as the control cable 586 of FIG. 5). For example, one control cable 586 may connect the current interrupters 720b to the control system and a separate control cable 586 may connect the transformers 720a to the control system. Additionally, each of the current interrupters 720b includes an open/close indicator 727, which has two distinct states that indicate whether the current interrupter is closed (allowing current to flow) or open (not allowing current to flow). The indicator 727 is visible to an operator viewing the underside 770.

Figure 8C:
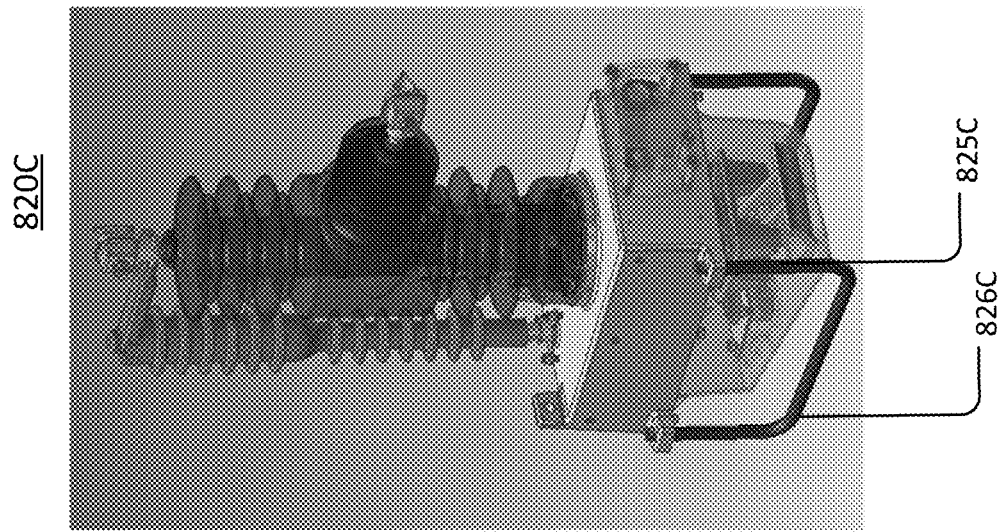
FIGS. 8A-8C are perspective views of exemplary electrical apparatuses.
Figure 8B:
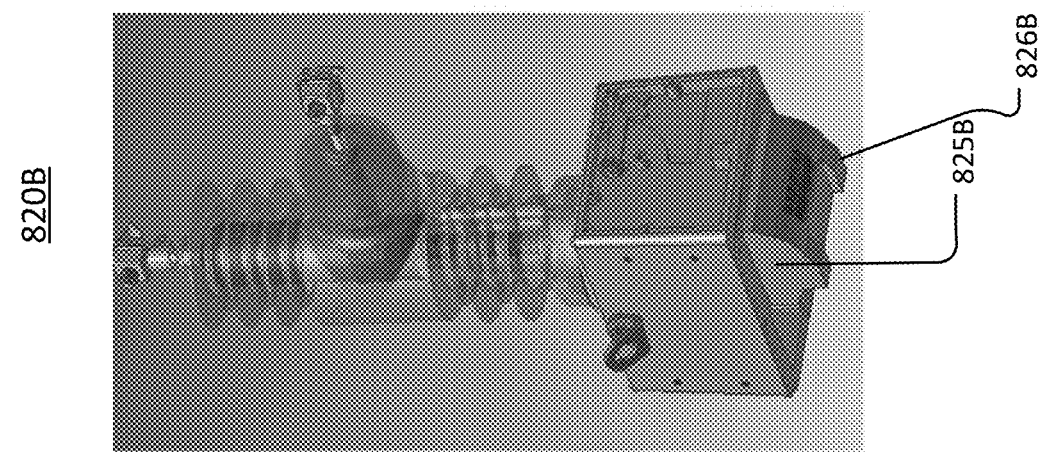
Figure 8A:
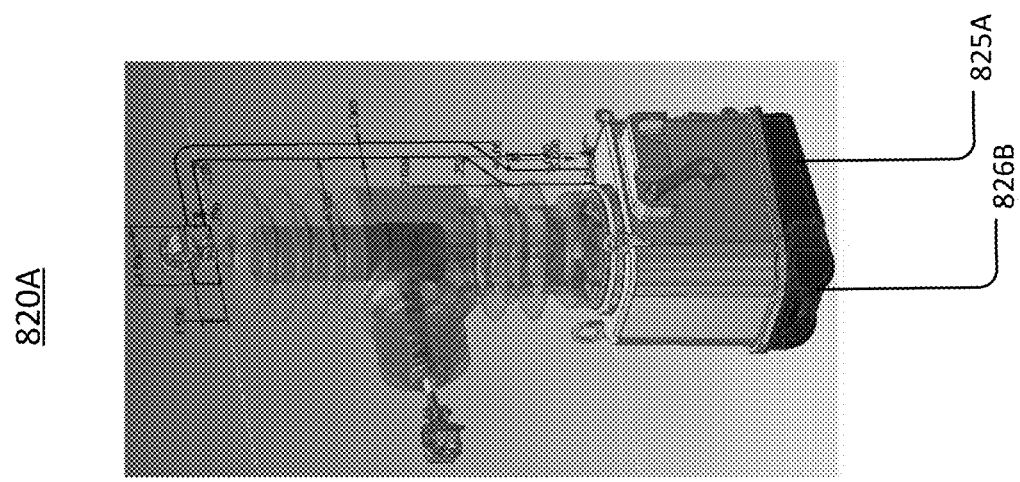

FIGS. 8A-8C show a perspective views of current interrupters 820A, 820B, 820C, respectively. The current interrupters 820A, 820B, 820C may be vacuum interrupters. Any of the current interrupters 820A-820C may be used as the electrical apparatus 220, and the current interrupters 820A-820C may connect to any of the support structures 130, 230, 330, 430, 530, and 730. Each current interrupter 820A-820C includes a respective base portion 825A-825C that has a respective end 826A-826C. The base portions 825A-825C are configured and sized such that the respective end 826A-826C aligns with a bottom end of a support frame (such as the end 272 of FIG. 2D). The base portions 825A-825C may be block-like, such as the base portions 825A and 825B, or the base portion may be a set of rails, such as the base portion 825C.

Other features are within the scope of the claims. For example, any of the support structures 130, 230, 330, 430, 530, and 730 may be a single, unitary piece of material, such as a metal, that is formed from a plurality of individual pieces that are joined (for example, by welding and/or by joining slots in one individual piece of the frame with a corresponding tab of another individual piece of the fame). The support structures 130, 230, 330, 430, 530, and 730 may be made from a metal, such as steel, or other robust material that allows the structure to support more than one electrical apparatus that weighs, for example, 125 pounds (lbs), 150 lbs, or 300 lbs and allows the structure to withstand winds of up to, for example, 40 meters/second. In other examples, any of any of the support structures 130, 230, 330, 430, 530, and 730 may be cut from a block of material or cast using a mold.

The support structures 230, 330, 430, 530, and 730 may include more or fewer mechanical and electrical interfaces than shown.

What is claimed is:

1. A support structure configured to hold an electrical apparatus configured for use in an electrical power distribution system, the support structure comprising:
   a frame comprising a mechanical interface, the mechanical interface configured to directly couple to a mechanical connection of the electrical apparatus;
   a support housing connected to the frame, the support housing comprising a top portion and at least two side portions, each side portion extending from the top portion in a first direction; and an electrical panel comprising at least one electrical interface configured to electrically couple to an electrical connector of the electrical apparatus, wherein the electrical panel is connected to the frame and is between two of the side portions of the support housing, the electrical panel is separated from the top portion of the support housing along the first direction, and the at least one electrical interface faces an exterior of a space defined by the top portion of the support housing, the side portions of the support housing, and the electrical panel.

2. The support structure of claim 1, wherein the top portion of the support housing comprises a substantially flat section.

3. The support structure of claim 2, further comprising a bracket that extends along the first direction between the top portion of the support housing and the frame, and wherein the substantially flat section extends from the bracket at an angle that is less than 90 degrees.

4. The support structure of claim 1, wherein the electrical panel extends from a portion of the frame, and the electrical panel is not perpendicular to the portion of the frame.

5. The support structure of claim 1, wherein the mechanical interface is configured to couple to a mechanical connection that is on a second housing, wherein the second housing at least partially encloses the electrical apparatus.

6. The support structure of claim 1, wherein one end of the electrical panel is hingedly connected to (a) one of the two of the side portions of the support housing or (b) to the frame.

7. The support structure of claim 1, wherein the support structure further comprises a bracket connected to the frame, the bracket comprises a first side and a second side, the top portion of the support housing extends from the first side of the bracket, and the second side of the bracket defines a channel, the channel configured to receive a utility pole.

8. The support structure of claim 1, wherein one or more posts extend from the frame along the first direction and away from the top portion of the support housing, and the one or more posts are configured to hold the support structure upright.

9. The support structure of claim 1, wherein the electrical panel is removably connected to the frame.

10. The support structure of claim 1, wherein
the frame comprises at least a first frame portion, a second frame portion, a third frame portion, and a fourth frame portion, and wherein the first frame portion is connected to the second and third frame portions, the fourth frame portion is connected to the second and third frame portions, and at least one of the first frame portion, the second frame portion, the third frame portion, and the fourth frame portion comprises the mechanical interface;
the support structure further comprises a bracket connected to the first frame portion; and
the top portion of the support housing is connected to the bracket.

11. The support structure of claim 10, wherein a first end of the electrical panel is connected to the first frame portion at a connection interface.

12. The support structure of claim 11, wherein the connection interface is configured to allow the electrical panel to move relative to the first frame portion.

13. The support structure of claim 10, wherein each of the at least two side portions extends between the top portion and the electrical panel such that the space is completely enclosed.

14. The support structure of claim 10, wherein the electrical panel extends from the first frame portion at an angle that is less than 90 degrees or greater than 90 degrees.

15. The support structure of claim 1, wherein the support structure is configured to hold more than one electrical apparatus configured for use in an electrical power distribution system;
the frame is a single-piece frame comprising a plurality of mechanical interfaces, each mechanical interface configured to directly couple to an electrical apparatus, the single-piece frame further comprising:
a first frame portion;
a second frame portion;
a third frame portion extending from the first frame portion to the second frame portion, and
a fourth frame portion extending from the first frame portion to the second frame portion; and
wherein the electrical panel comprises a first panel side, a second panel side, and plurality of electrical interfaces at the first panel side, each electrical interface configured for electrical connection to an electrical apparatus, wherein
the top portion extends over the second panel side.

16. The support structure of claim 15, further comprising a bracket that extends between the first frame portion and the top portion along the first direction, wherein
the electrical panel is configured to be received in the single-piece frame at an angle relative to the first direction, the angle being greater than 90 degrees or less than 90 degrees.

17. The support structure of claim 15, wherein
each of the first frame portion, the second frame portion, the third frame portion, and the fourth frame portion comprises a substantially planar portion that extends along the first direction, and
and each of the plurality of mechanical interfaces is formed in the planar portion of any of the second frame portion, the third frame portion, and the fourth frame portion.

18. The support structure of claim 1, wherein the electrical panel is substantially planar, and the electrical panel comprises more than one electrical interface.

19. A support structure configured to hold an electrical apparatus configured for use in an electrical power distribution system, the support structure comprising:
a frame comprising a mechanical interface configured to couple to a mechanical connection of the electrical apparatus;
a support housing connected to the frame, the support housing comprising a top portion and at least two side portions, each side portion extending from the top portion in a first direction, wherein the top portion of the support housing comprises a substantially flat section;
an electrical panel comprising at least one electrical interface configured to electrically couple to an electrical connector of the electrical apparatus, wherein the electrical panel is connected to the frame and is between two of the side portions of the support housing, the electrical panel is separated from the top portion of the support housing along the first direction, and the at least one electrical interface faces an exterior of a space defined by the top portion of the support housing, the side portions of the support housing, and the electrical panel; and
a bracket that extends along the first direction between the top portion of the support housing and the frame, and wherein the substantially flat section extends from the bracket at an angle that is less than 90 degrees.

20. A support structure configured to hold an electrical apparatus configured for use in an electrical power distribution system, the support structure comprising:
    a frame comprising a mechanical interface configured to couple to a mechanical connection of the electrical apparatus;
    a support housing connected to the frame, the support housing comprising a top portion and at least two side portions, each side portion extending from the top portion in a first direction; and
    an electrical panel comprising at least one electrical interface configured to electrically couple to an electrical connector of the electrical apparatus, wherein the electrical panel is connected to the frame and is between two of the side portions of the support housing; the electrical panel is separated from the top portion of the support housing along the first direction; the electrical panel extends from a portion of the frame, and the electrical panel is not perpendicular to the portion of the frame; and the at least one electrical interface faces an exterior of a space defined by the top portion of the support housing, the side portions of the support housing, and the electrical panel.

21. A support structure configured to hold an electrical apparatus configured for use in an electrical power distribution system, the support structure comprising:
    a frame comprising a mechanical interface configured to couple to a mechanical connection of the electrical apparatus;
    a support housing connected to the frame, the support housing comprising a top portion and at least two side portions, each side portion extending from the top portion in a first direction; and
    an electrical panel comprising at least one electrical interface configured to electrically couple to an electrical connector of the electrical apparatus, wherein the electrical panel is connected to the frame and is between two of the side portions of the support housing, the electrical panel is separated from the top portion of the support housing along the first direction, and the at least one electrical interface faces an exterior of a space defined by the top portion of the support housing, the side portions of the support housing, and the electrical panel, and wherein
    the mechanical connection is on a second housing that at least partially encloses the electrical apparatus.

* * * * *